(12) United States Patent
Saito et al.

(10) Patent No.: US 8,305,224 B2
(45) Date of Patent: Nov. 6, 2012

(54) IN-TRAIN DISPLAY-DEVICE MANAGEMENT SYSTEM AND IN-TRAIN DISPLAY-DEVICE MANAGEMENT METHOD

(75) Inventors: Ryota Saito, Chiyoda-ku (JP); Masao Oki, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 196 days.

(21) Appl. No.: 12/995,873

(22) PCT Filed: Jan. 21, 2009

(86) PCT No.: PCT/JP2009/050879
§ 371 (c)(1),
(2), (4) Date: Dec. 2, 2010

(87) PCT Pub. No.: WO2010/004773
PCT Pub. Date: Jan. 14, 2010

(65) Prior Publication Data
US 2011/0095899 A1 Apr. 28, 2011

(30) Foreign Application Priority Data
Jul. 7, 2008 (JP) ................................. 2008-177197

(51) Int. Cl.
*G08B 3/00* (2006.01)
(52) U.S. Cl. .................................... 340/691.6; 340/438
(58) Field of Classification Search ............... 340/691.6, 340/438, 539.1
See application file for complete search history.

(56) References Cited

U.S. PATENT DOCUMENTS
2010/0321176 A1* 12/2010 Hofmann et al. ............. 340/438

FOREIGN PATENT DOCUMENTS

| JP | 5-113776 A | 5/1993 |
|---|---|---|
| JP | 6-308907 A | 11/1994 |
| JP | 2002-209193 A | 7/2002 |
| JP | 2002-238065 A | 8/2002 |
| JP | 2002-278531 A | 9/2002 |
| JP | 2004-70254 A | 3/2004 |
| JP | 2007-65098 A | 3/2007 |
| TW | I269262 | 12/2006 |

OTHER PUBLICATIONS

International Search Report (PCT/ISA/210) dated Apr. 21, 2009.
Written Opinion (PCT/ISA/237) dated Apr. 21, 2009.
Office Action dated May 12, 2011, issued in the corresponding Taiwanese Patent Application No. 098102438.

* cited by examiner

*Primary Examiner* — Shirley Lu
(74) *Attorney, Agent, or Firm* — Buchanan Ingersoll & Rooney PC (57) ABSTRACT

To provide an in-train-display management device that is incorporated in a train constituted by a plurality of vehicles and is connected to a plurality of display devices arranged in each vehicle of the train by a transmission path, and displays whether a driving status of the display devices is normal on one screen per predetermined unit to collectively manage the driving status of the display devices. By collectively displaying the status of the display devices arranged in each vehicle of the train on one screen, status management of the display devices can be easily and collectively ascertained and managed, thereby enabling easy management of maintenance of the display devices arranged in the vehicles.

15 Claims, 6 Drawing Sheets

VEHICLE TRAVELING DIRECTION

IN-TRAIN DISPLAY-DEVICE MANAGEMENT SYSTEM AND IN-TRAIN DISPLAY-DEVICE MANAGEMENT METHOD

TECHNICAL FIELD

The present invention relates to an in-train display-device management system and an in-train display-device management method, and more particularly to an in-train display-device management system and an in-train display-device management method for collectively managing maintenance of a plurality of display devices arranged in a train.

BACKGROUND ART

Conventionally, in a railroad train, display devices using a liquid crystal display are arranged in each vehicle of the train as a display unit of an in-vehicle information system to inform guidance such as travel information and advertisements to the passengers (see, for example, Patent Document 1).

In such in-vehicle display devices, quality needs to be maintained constant to reliably inform the guidance such as travel information and advertisements to the passengers. Meanwhile, a liquid crystal display of the display device has an operating life, and its luminance decreases according to the time of operation. When the luminance of the liquid crystal display decreases, a screen display becomes dark to degrade display quality and image visibility becomes poor. Further, because the decrease in luminance of liquid crystal displays is not uniform and is individually different, maintenance needs to be performed for each display device.

Conventionally, therefore, a maintenance worker goes around a train to confirm display brightness (luminance) of display devices one by one, and determines necessity of maintenance such as replacement for each of the display devices.

Patent Document 1: Japanese Patent Application Laid-open No. 2004-70254

DISCLOSURE OF INVENTION

Problem to be Solved by the Invention

However, because such display devices are arranged in plural, a large number of display devices are used in one formation of trains. Therefore, it is a considerably time-consuming work to manage the necessity of maintenance of display devices one by one, and maintenance workers have a heavy workload.

The present invention has been achieved to solve the above problems, and an object of the present invention is to provide an in-train display-device management system and an in-train display-device management method capable of easily managing maintenance of a plurality of display devices arranged in vehicles.

Means for Solving Problem

To solve the problems as above-mentioned and to achieve the object, the in-train display-device management system comprises: a monitoring unit that detects a driving status of the display devices to generate monitoring information; an analyzer that generates, as analysis information of the driving status of the display devices, as a result of determination whether the display devices maintain image display quality based on the monitoring information of the display devices; a storage unit that stores the monitoring information and the analysis information; a status display panel that collectively displays the driving status of the display devices per vehicle unit based on the analysis information; and a display controller that controls display on the status display panel, and displays a predetermined alarm indicating that an end of operating life is approaching on the status display panel, as the driving status of the display devices, based on the analysis information of the display devices before the end of operating life, wherein the monitoring information is luminance information at a time of displaying an image on the display devices, and the analyzer analyzes the driving status of the display devices based on the luminance information, and when luminance at a time of displaying an image on the display devices is in a range between a mean value of luminance of entirety of the display devices collectively managed and a half-value of standard luminance set in advance at a time of displaying an image, the display controller causes the predetermined alarm to be displayed on the status display panel.

Effect of the Invention

According to the present invention, status management of a plurality of display devices can be collectively ascertained and managed, and maintenance of a plurality of display devices arranged in vehicles of a train can be easily managed, by displaying the status of the display devices arranged in the vehicles collectively on one screen.

EXPLANATIONS OF LETTERS OR NUMERALS

2 Transmission path
3 Transmission path
4 Transmission path
10a In-train display-device management device
10s Monitoring unit
10sp Luminance sensor
11 Display device
11a, 11b, 11c Display device
11h Light hole
12a, 12b, 12c Display device
18 Storage unit
19 Status display panel
21a, 21b, 21c Display device
22a, 22b, 22c Display device
31a, 31b, 31c Display device
32a, 32b, 32c Display device
41 Analyzer
42 Display controller
50 Status display unit
100a Analyzer
100b Analyzer
100c Analyzer
101 Transmission path
102 Transmission path

BEST MODE(S) FOR CARRYING OUT THE INVENTION

Exemplary embodiments of an in-train display-device management system and an in-train display-device management method according to the present invention will be explained below in detail with reference to the accompanying drawings. The present invention is not limited to the following descriptions and changes can be appropriately made without departing from the scope of the invention.

First Embodiment

Figure 1:
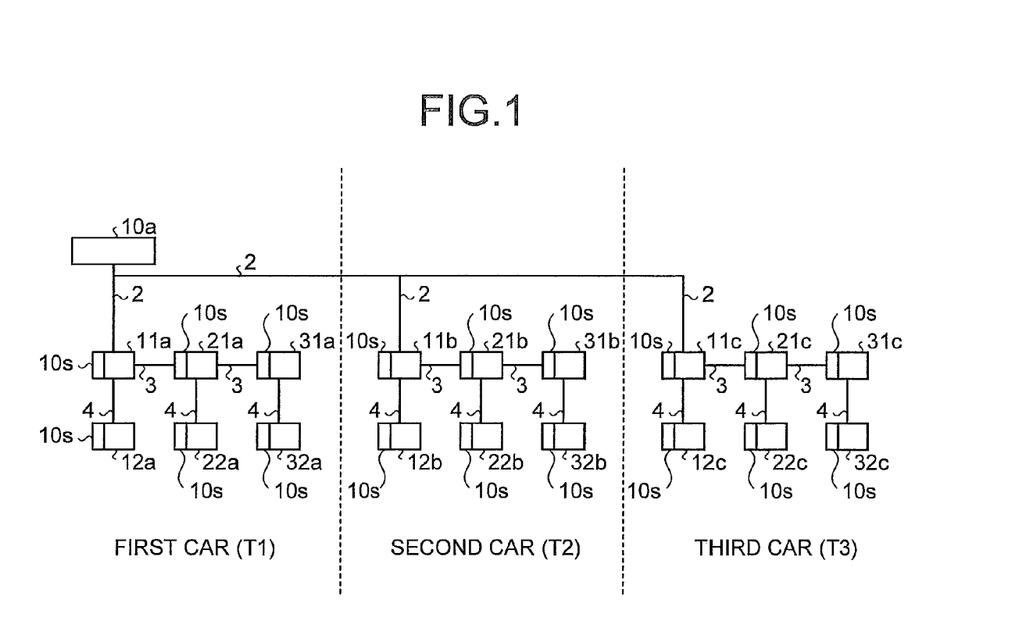
FIG. 1 is an explanatory diagram of a configuration of an in-train display-device management system according to a first embodiment of the present invention.

FIG. 1 is a schematic configuration diagram of an in-train display-device management system according to a first embodiment of the present invention. In FIG. 1, vehicles of a train are first to nth vehicles; however, an example of three-car train in the case of N=3 is shown in FIG. 1. In a first vehicle T1, display devices 11a, 12a, 21a, 22a, 31a, and 32a using a liquid crystal display (LCD) as a display apparatus in an in-train information system are mounted for displaying guidance such as travel information and advertisements to the passengers.

Likewise, in a second car T2, display devices 11b, 12b, 21b, 22b, 31b, and 32b using the liquid crystal display as the display apparatus in the in-train information system are mounted for displaying guidance such as travel information and advertisements to the passengers. In a third car T3, display devices 11c, 12c, 21c, 22c, 31c, and 32c using the liquid crystal display as the display apparatus in the in-train information system are mounted for displaying guidance such as travel information and advertisements to the passengers (hereinafter, these display devices can be collectively referred to as "display device(s) 11").

Figure 2:
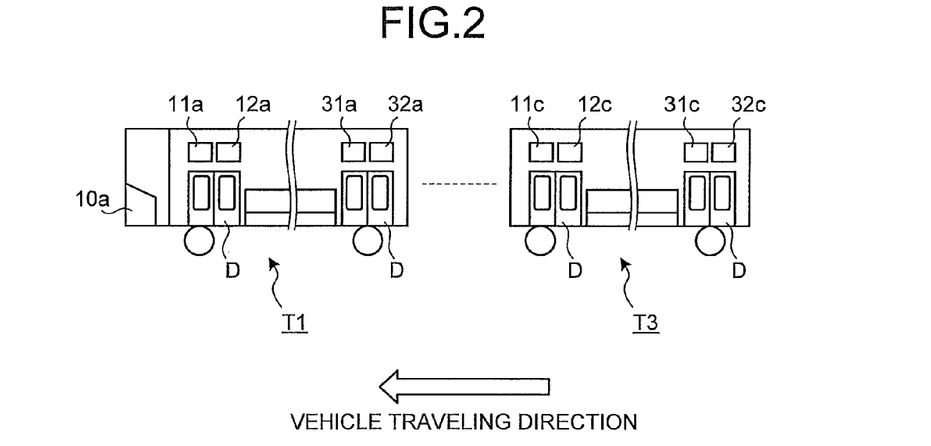
FIG. 2 is an explanatory diagram of the in-train display-device management system according to the first embodiment of the present invention.

For example, as shown in FIG. 2, these display devices 11 are installed two each at top portions above respective doors on one side in the vehicle. In FIG. 1, the number of display devices 11 in each vehicle is six; however, the number of display devices to be installed in each vehicle is not limited to six.

The in-train display-device management system according to the first embodiment monitors a driving status of the display devices 11 arranged in the first car T1 to the third car T3 and displays the driving status on one screen per predetermined unit, to collectively manage the driving status of the display devices arranged in the first car T1 to the third car T3. The in-train display-device management system collectively manages the driving status of the display devices per formation of trains. The in-train display-device management system according to the first embodiment includes a monitoring unit 10s respectively arranged in each display device 11 and an in-train display-device management device 10a incorporated in the first car T1, which is a leading vehicle.

The in-train display-device management device 10a and the display device 11 are connected by a transmission path 2, and the display devices 11a, 21a, and 31a, the display devices 11b, 21b, and 31b, and the display devices 11c, 21c, and 31c are respectively connected via a transmission path 3. The display devices 11a and 12a, the display devices 21a and 22a, and the display devices 31a and 32a are respectively connected via a transmission path 4. Both a digital transmission path and an analog transmission path can be used as these transmission paths 2, 3, and 4.

Figure 3:
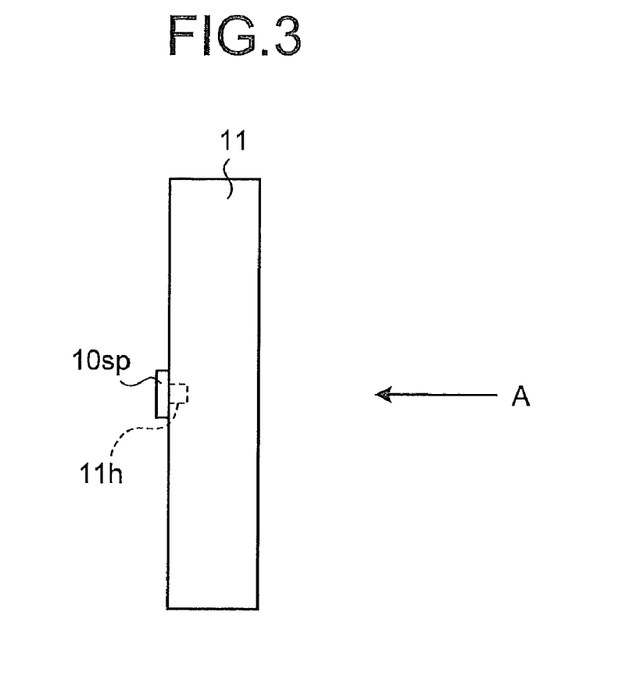
FIG. 3 is an explanatory diagram of an example of an arrangement position of a luminance sensor in the in-train display-device management system according to the first embodiment of the present invention.

The monitoring unit 10s detects the driving status of the respective display devices 11 to generate monitoring information for each of the display devices 11. The monitoring unit 10s includes a luminance sensor (a photometer) that monitors luminance at the time of displaying an image on the display device 11 and generates luminance information as the monitoring information. FIG. 3 is an explanatory diagram of an example of an arrangement position of the luminance sensor. In FIG. 3, a screen of the display device 11 is viewed from a direction of an arrow A. For example, as shown in FIG. 3, a light hole 11h is provided at the center on a rear side of the display device 11, and a luminance sensor 10sp is arranged to sense backlight of the liquid crystal display leaking outside from the light hole.

The monitoring unit 10s also includes an elapsed time counter that counts and integrates an elapsed time of image display on the display device 11 to generate elapsed display time information as the monitoring information. Specifically, the elapsed time counter counts a driving time of the backlight of the liquid crystal display in the display device 11. The count of the driving time of the backlight can be acquired by a counting time during which power is supplied to the backlight.

Figure 4:
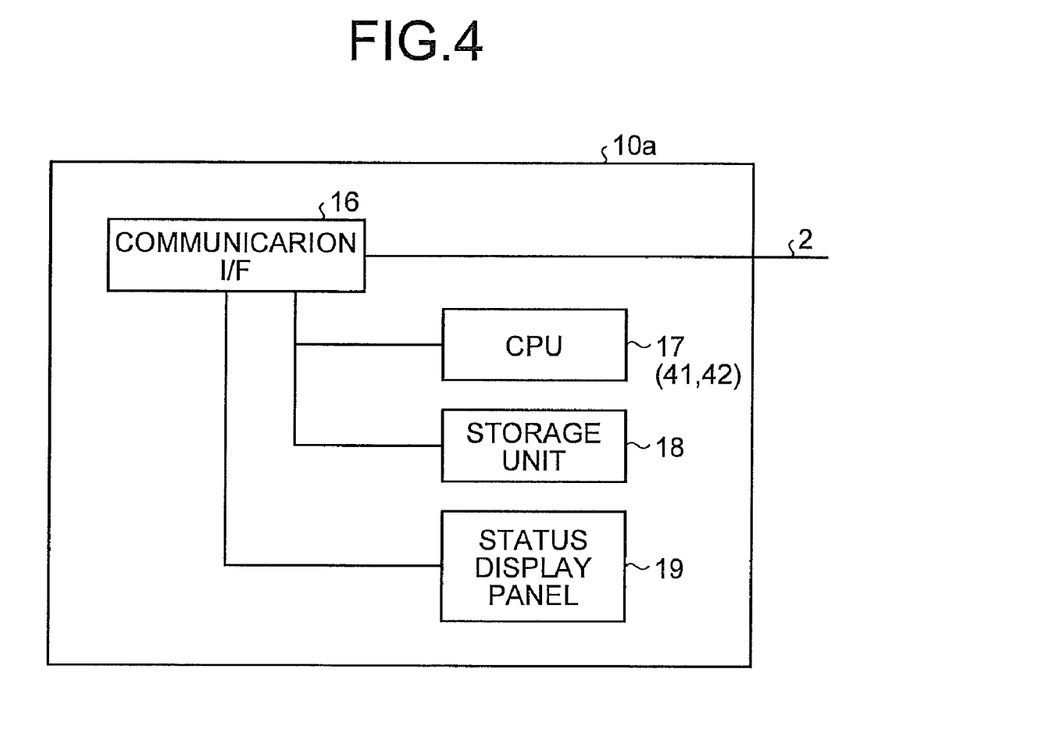
FIG. 4 is a block diagram of an inner structure of an in-train display-device management device in the in-train display-device management system according to the first embodiment of the present invention.

FIG. 4 is a block diagram of an inner structure of the in-train display-device management device 10a incorporated in the first car T1. As shown in FIG. 4, the in-train display-device management device 10a includes a communication I/F 16, a CPU 17, a storage unit 18, and a status display panel 19.

The communication I/F 16 has a plurality of transmission interface functions. Connection between the in-train display-device management device 10a and the display device 11 by the transmission path 2 is performed via the communication I/F 16. The CPU 17 is an arithmetic unit that controls the in-train display-device management system. An analyzer 41 and a display controller 42 are loaded on the storage unit 18 by reading and executing a program stored in the storage unit 18 by the CPU 17, so that the analyzer 41 and the display controller 42 are generated in the storage unit 18 as a software configuration.

The program executed by the CPU 17 can be stored in a recording medium readable by the in-train display-device management device 10a, such as CD-ROM, Floppy® disk (FD), or DVD, in an installable or executable format to be provided.

The analyzer 41 acquires and analyzes the monitoring information of all of the display devices 11 so as to generate analysis information of the driving status of all of the display devices 11. For example, the analyzer 41 acquires and analyzes the luminance information of all of the display devices 11 as the monitoring information so as to generate analysis information of a display luminance status of all of the display devices 11. For example, the analyzer 41 acquires and analyzes elapsed display time information of all of the display devices 11 as the monitoring information so as to generate analysis information of an elapsed time status of all of the display devices 11.

The display controller 42 controls display on the status display panel 19 based on the analysis information. The storage unit 18 stores various pieces of data including the monitoring information and various programs for controlling the in-train display-device management system under control of the CPU 17. The status display panel 19 collectively displays the driving status of the display devices 11 based on the analysis information. The status display panel 19 can collectively display the driving status of the display devices 11 in a vehicle unit as a predetermined unit, under control of the display controller 42. Further, the status display panel 19 can collectively display the driving status of the display devices 11 per formation as a predetermined unit, under control of the display controller 42.

Figure 5:
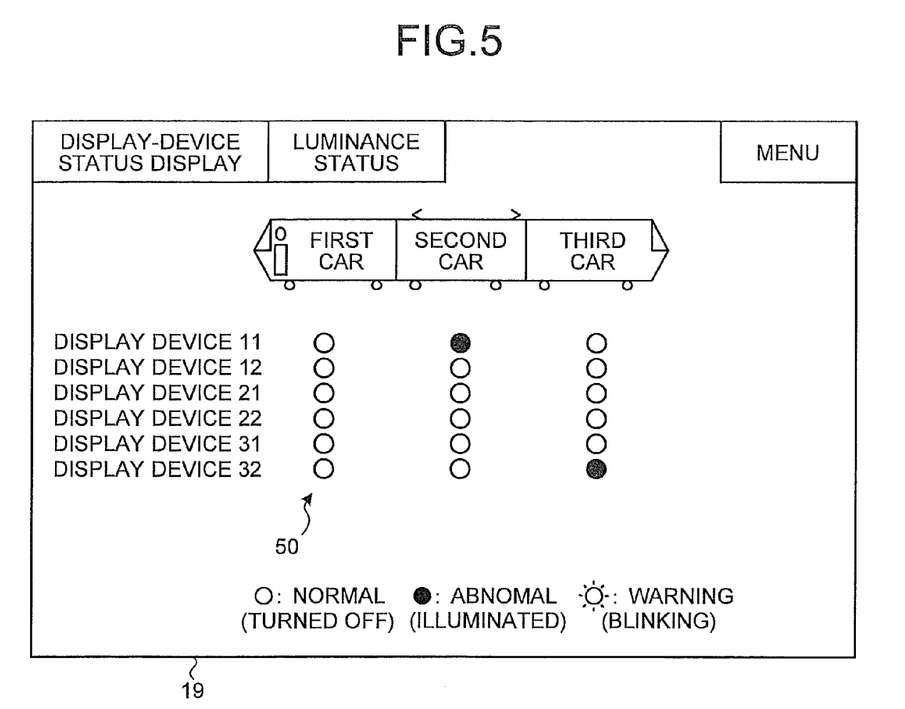
FIG. 5 is an example of a screen of a status display panel in the in-train display-device management system according to the first embodiment of the present invention.

FIG. 5 is an example of a screen of the status display panel 19 when the luminance status of the liquid crystal display (LCD) of the display device 11 is collectively displayed on the status display panel 19 as the driving status of the display device 11. In FIG. 5, such a display form is shown that when the driving status of the display device 11 is normal, corresponding one of a status display unit 50 is turned off, when the driving status of the display device is abnormal, corresponding one of the status display unit 50 is illuminated (alarm display), and when the driving status of the display device 11 is in a predetermined warning condition, the corresponding status display unit blinks (alarm display).

FIG. 5 depicts a case that the driving status of the display device 11 is collectively displayed on the status display panel 19, designating the luminance status of the liquid crystal display (LDC) of the display device 11 as a checking element. However, the driving status of the display device 11 can be collectively displayed on the status display panel 19, designating the elapsed time of image display on the display device 11 as the checking element, or other items can be designated as the checking element. The driving status of the display device 11 in which these checking elements are integrated can be collectively displayed on the status display panel 19.

Figure 6:
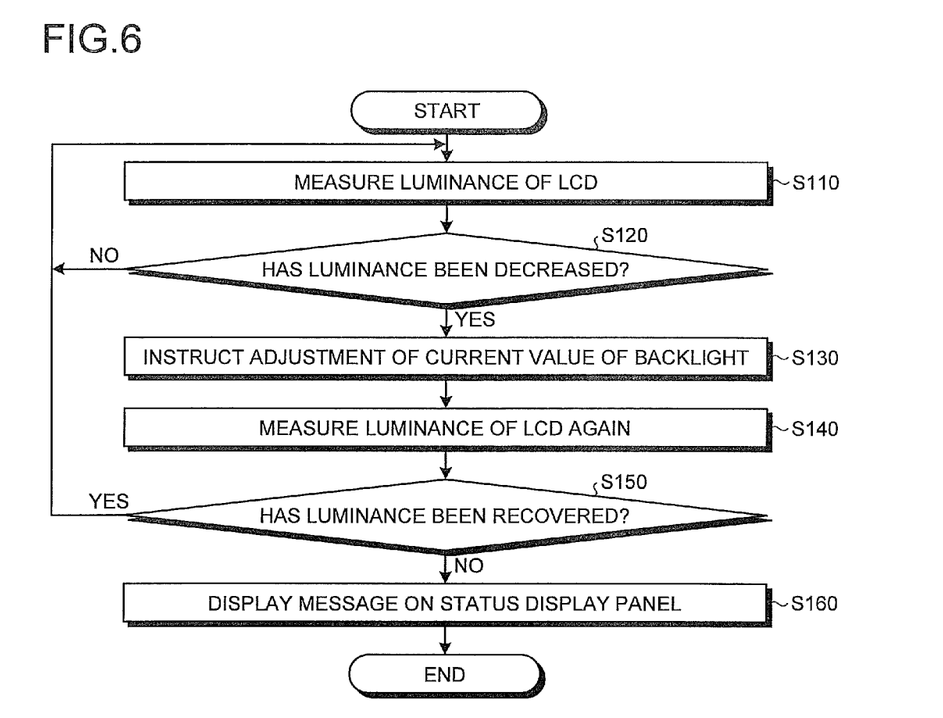
FIG. 6 is a flowchart for explaining an operation of the in-train display-device management system according to the first embodiment of the present invention.

An operation of the in-train display-device management system according to the first embodiment is explained next with reference to FIG. 6, for a case that luminance information is used as monitoring information, as an example. FIG. 6 is a flowchart for explaining the operation of the in-train display-device management system.

First, the luminance sensor 10sp in each monitoring unit 10s measures luminance of the liquid crystal display (LCD) at the time of displaying an image on each of the display devices 11 periodically with a predetermined interval so as to generate luminance information as the monitoring information (Step S110).

Next, the analyzer 41 acquires and analyzes the monitoring information of all of the display devices 11 so as to generate analysis information of the driving status of all of the display devices 11. That is, the analyzer 41 acquires the luminance information of all of the display devices 11 as the monitoring information. The analyzer 41 determines whether the luminance of the liquid crystal display (LCD) of the display device 11 has decreased to a level lower than a predetermined value for maintaining image display quality based on the acquired luminance information, and generates a determination result thereof as analysis information (Step S120).

When analysis information indicating that the luminance of the liquid crystal display (LCD) of the display device 11 has not decreased to the level lower than the predetermined value for maintaining the image display quality (normal luminance information) is generated (NO at Step S120), the analyzer 41 transmits the analysis information (normal luminance information) to the luminance sensor in the monitoring unit 10s. The luminance sensor continues measurement of luminance of the liquid crystal display (LCD) based on the analysis information (normal luminance information) (Step S110). The analyzer 41 also transmits the analysis information (normal luminance information) to the display controller 42. The display controller 42 causes a message indicating that the luminance of the display device 11 is normal to be displayed on the status display panel 19 based on the analysis information (normal luminance information).

On the other hand, when analysis information indicating that the luminance of the liquid crystal display (LCD) of the display device 11 has decreased to a level lower than the predetermined value for maintaining the image display quality (luminance decrease information) is generated (YES at Step S120), the analyzer 41 transmits the analysis information (luminance decrease information) to the display device 11 as current-value adjustment-instruction information of the backlight so as to instruct the display device 11 to adjust a current value of the backlight of the liquid crystal display (LCD) (Step S130). The display device 11 adjusts the current value of the backlight of the liquid crystal display (LCD) based on the analysis information (luminance decrease information).

Thereafter, the luminance sensor in the monitoring unit 10s of the corresponding display device 11 measures the luminance of the liquid crystal display (LCD) again at the time of displaying an image on the display device 11 so as to generate adjusted luminance information as the monitoring information (Step S140). The analyzer 41 acquires and analyzes the monitoring information of the corresponding display device 11 so as to generate analysis information of the driving status of the display device 11. That is, the analyzer 41 acquires the adjusted luminance information of the corresponding display device 11. The analyzer 41 then determines whether the luminance of the liquid crystal display (LCD) of the display device 11 has recovered to a value higher than the predetermined value for maintaining the image display quality so as to generate a result thereof as the analysis information (Step S150).

When having determined that the luminance of the liquid crystal display (LCD) of the display device 11 has recovered to a value higher than the predetermined value for maintaining the image display quality (YES at Step S150), the analyzer 41 generates analysis information indicating that the luminance of the liquid crystal display (LCD) of the display device 11 has recovered to a normal value (luminance recovery information) as the analysis information, and transmits the analysis information to the display controller 42. The display controller 42 causes a message indicating that the luminance of the display device 11 is normal to be displayed on the status display panel 19 based on the analysis information (luminance recovery information). The analyzer 41 transmits the analysis information (luminance recovery information) to the luminance sensor in the monitoring unit 10s. The luminance sensor continues monitoring of luminance of the liquid crystal display (LCD) based on the analysis information (luminance recovery information) (Step S110).

On the other hand, when having determined that the luminance of the liquid crystal display (LCD) of the display device 11 has not recovered to a value higher than the predetermined value for maintaining the image display quality (NO at Step S150), the analyzer 41 generates analysis information indicating that the luminance is abnormal (abnormal luminance information) as the analysis information, and transmits the analysis information to the display controller 42. The display controller 42 causes a message indicating that the luminance of the display device 11 is abnormal to be displayed on the status display panel 19 based on the analysis information (abnormal luminance information) (alarm display) (Step S160).

According to the above processes, the in-train display-device management system according to the first embodiment can display the driving status (a luminance status of the liquid crystal display (LCD)) of all of the display devices 11 arranged in the first to third cars T1 to T3 on the status display panel 19 and collectively manage the driving status.

As the predetermined value for maintaining the image display quality, for example, a half-value of standard luminance at the time of displaying an image on a new display device 11 can be adopted. The analyzer 41 calculates a mean value of luminance of the entire display devices 11 collectively managed based on the analysis information. When the luminance at the time of displaying an image on the display device 11 is within a range between the mean value of luminance of the entire display devices 11 collectively managed and the half-value of standard luminance set in advance at the time of displaying an image (in a warning condition), an alarm message can be displayed on the status display panel 19 as a warning indicating that "end of operating life is approaching". Accordingly, before the operating life of the display device 11 ends, replacement of the display device 11 can be prepared in advance. The number of display devices 11 whose replacement timing is approaching can be ascertained, which can be used as information at the time of planning maintenance.

When luminance of the respective display devices 11 collectively managed at the time of displaying an image is lower than the half-value of the standard luminance set in advance at the time of displaying an image (in a warning condition), the analyzer 41 can cause an alarm message to be displayed on the status display panel 19, as a warning indicating that "end of operating life is approaching". Accordingly, before the operating life of the display device 11 ends, replacement of the display device 11 can be prepared in advance for each display device 11. The number of the display devices 11 whose replacement timing is approaching can be ascertained, which can be used as the information at the time of planning the maintenance.

The half-value of luminance is adopted as the predetermined value for maintaining the image display quality. However, even if the luminance of the display device 11 is slightly low, for example, while a train is traveling underground or in a long tunnel, when a display screen can be recognized sufficiently based on route information and position information of the train from a known train information controller incorporated in the train, a value lower than the half-value of the luminance can be adopted as the predetermined value, thereby enabling to finely manage the display device 11 and extend the replacement timing of the display device 11.

Figure 7:
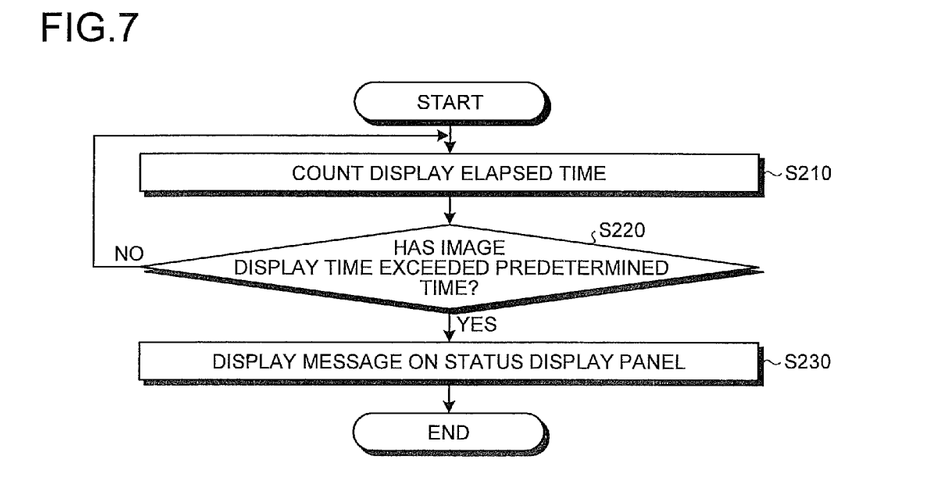
FIG. 7 is a flowchart for explaining an operation of the in-train display-device management system according to the first embodiment of the present invention.

The operation of the in-train display-device management system according to the first embodiment is explained next with reference to FIG. 7, for a case that the elapsed time information of image display on the display device 11 is used as the monitoring information as an example. FIG. 7 is a flowchart for explaining the operation of the in-train display-device management system.

First, the elapsed time counter in each monitoring unit 10s counts the elapsed time of image display on each display device 11 periodically with a predetermined interval so as to generate elapsed display time information as the monitoring information (Step S210).

The analyzer 41 acquires and analyzes the monitoring information of all of the display devices 11 so as to generate analysis information of the driving status of all of the display devices 11. That is, the analyzer 41 acquires elapsed display time information of all of the display devices 11 as the monitoring information. The analyzer 41 then determines whether the image display time of the liquid crystal display (LCD) of the display device 11 has exceeded a specified number of hours set in advance so as to generate a determination result thereof as the analysis information (Step S220).

When analysis information indicating that the elapsed display time of the display device 11 has not exceeded the specified number of hours set in advance (within-specified-time information) is generated (NO at Step S220), the analyzer 41 transmits the analysis information (within-specified-time information) to the elapsed time counter in the monitoring unit 10s. The elapsed time counter continues counting of the elapsed time of the image display on the display device 11 based on the analysis information (within-specified-time information) (Step S210). The analyzer 41 also transmits the analysis information (within-specified-time information) to the display controller 42. The display controller 42 causes a message indicating that the elapsed display time of the display device 11 has not exceeded a predetermined number of hours set in advance to be displayed on the status display panel 19.

On the other hand, when analysis information indicating that the elapsed display time of the display device 11 has exceeded the specified number of hours set in advance (outside-specified-time information) is generated (YES at Step S220), the analyzer 41 transmits the analysis information (outside-specified-time information) to the display controller 42. The display controller 42 causes a message indicating that the elapsed display time of the display device 11 has exceeded the predetermined number of hours set in advance to be displayed on the status display panel 19 (alarm display) (Step S230). Also in this case, the elapsed time counter continues counting of the elapsed time of the image display on the display device 11.

The in-train display-device management system according to the first embodiment can display the driving status of all display devices (an elapsed time of the image display on the display devices 11) arranged in the first to third cars T1 to T3 on the status display panel 19, and collectively manage the driving status. For example, the predetermined number of hours can be the number of hours less than a standard lifetime of the display device 11 by dozens of hours. By setting such number of hours, for example, even if the luminance status of the display device 11 at the time of displaying an image is normal, it can be known in advance that an end of the operating life is approaching, and replacement of the display device 11 can be prepared in advance before the operating life of the display device 11 ends. Further, the number of display devices whose replacement timing is approaching can be ascertained, which can be used as information at the time of planning maintenance.

The driving status of the display device 11 is monitored based on screen luminance of the display device 11 or the elapsed time of screen display to estimate the operating life as the monitoring information; however, the replacement timing can be set not to degrade services for the passengers by comprehensively determining the luminance and the elapsed time of the display.

To determine the operating life of the display device 11 more accurately, the monitoring information can include the status of the display device such as surrounding environment, for example, train information held by a vehicle information device (information such as temperature, humidity, and vibration in the vehicle, and power supply variation), thereby enabling more fine management of the operating life of the display device 11. For example, because the elapsed display time (lighting time) until the luminance of the display device 11 reaches the half-value becomes shorter (the operating life becomes shorter) as the ambient temperature decreases, the display device 11 can be managed more accurately by taking temperature into consideration.

Figure 8:
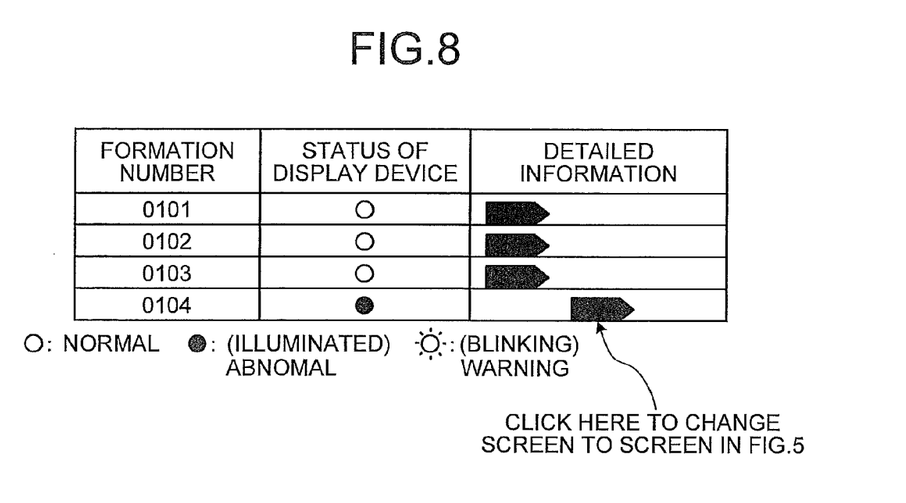
FIG. 8 is an example of a management screen of a display-device management device according to the first embodiment of the present invention that collectively manages display devices in a central distribution center.

Further, the in-train display-device management system can wirelessly transmit the information of the driving status of the display device 11 to a central distribution center on the ground that manages devices in the entire train, and the central distribution center can collectively manage the driving status of the display devices 11 in all formations that travel on all railway lines. For example, FIG. 8 depicts a management screen of a display-device management device that collectively manages the display devices 11 in the central distribution center. On the screen, the driving status of the display device 11 per formation of trains can be viewed at a glance, and if one of the display devices in each formation is abnormal, abnormality is displayed on a display-device status unit in the formation. When it is checked in which vehicle and where in the vehicle the abnormal display device 11 is, a screen having the same content as that of the status display panel 19 in the in-train display-device management device 10a (for example, a display screen in FIG. 5) is displayed by clicking an icon in a detailed information unit.

With this configuration, the driving status of all of the display devices 11 installed in train vehicles can be collectively managed on a real-time basis in the central distribution center, and replacement of the display device 11 can be prepared before the operating life of the display device 11 ends, for the display devices 11 in all formations. Further, the number of the display devices 11 whose replacement timing is approaching can be ascertained for the display devices 11 in all formations, thereby facilitating planning of maintenance of the entire display devices 11. For example, when six display devices 11 are used in one vehicle, and there are 150 formations of trains constituted by ten vehicles, which are the first to tenth cars, on all railway lines, the number of the entire display devices 11 becomes 6×10×150=9,000. By collectively managing such a large number of display devices as described above, for example, even if one display device 11 is suddenly malfunctioned while the vehicles are moving, degradation of services for the passengers can be avoided as much as possible by replacing the malfunctioned display device 11 by a normal display device 11 in a vehicle being in periodic inspections in a rail yard, as an emergency measure. In this case, more speedy response becomes possible by transmitting information of the management screen of the display-device management device that collectively manages the display devices 11 from the central distribution center to a mobile terminal (mobile phone, PDA or the like) held by a vehicle inspector in the rail yard, so that the vehicle inspector can directly ascertain where the normal display device 11 is.

Second Embodiment

A second embodiment is another example of the monitoring information described above, and the second embodiment explains an example in which the monitoring unit 10s uses temperature at the time of displaying an image on respective constituent devices in the display device 11 (for example, liquid crystal display (LCD), power source, substrate, inverter or the like) as the monitoring information. Because the basic configuration and operations of the in-train display-device management system according to the second embodiment are identical to those in the first embodiment, detailed explanations thereof will be omitted as these can be referred to the explanations of the first embodiment.

Figure 9:
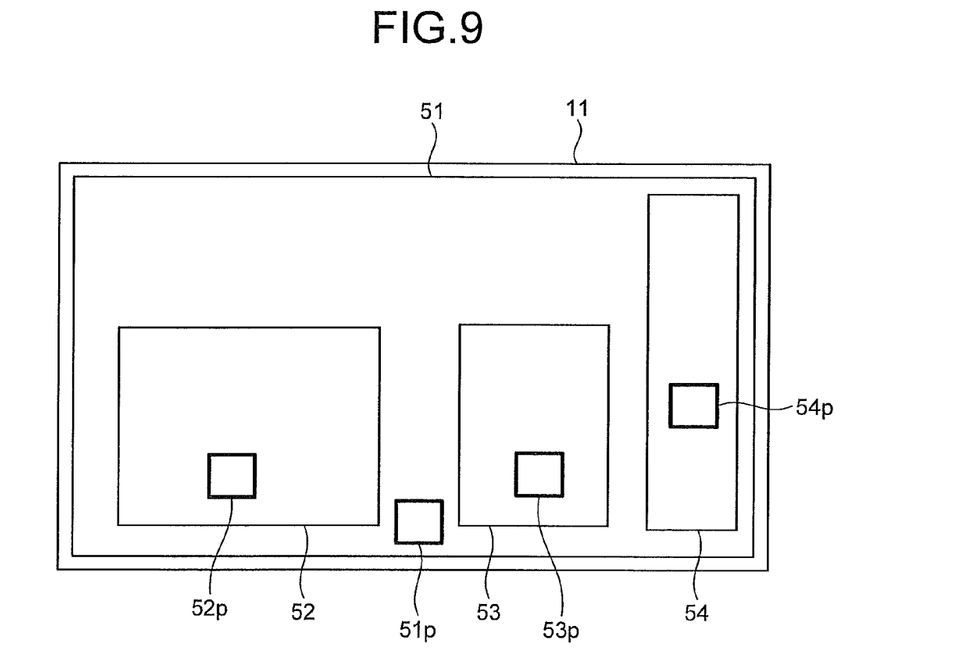
FIG. 9 is an explanatory diagram of an example of an arrangement position of a temperature sensor in an in-train display-device management system according to a second embodiment of the present invention.

The monitoring unit 10s detects the driving status of the respective display devices 11 to generate monitoring information for each of the display devices 11. In the second embodiment, for example, the monitoring unit 10s includes a temperature sensor that monitors temperature at the time of displaying an image on the respective constituent devices in the display device 11 to generate temperature information as the monitoring information. The monitoring unit 10s includes, for example, a temperature sensor 51p for an LCD 51, a temperature sensor 52p for a power source 52, a temperature sensor 53p for a substrate 53, and a temperature sensor 54p for an inverter 54, which are the constituent devices in the display device 11.

FIG. 9 is an explanatory diagram of an example of an arrangement position of the temperature sensor, and depicts an arrangement of the respective constituent devices and the temperature sensors, when the inside of the display device 11 is viewed from a back side of the display device 11. The temperature sensor is arranged to measure the temperature on the surface of the respective constituent devices in the display device 11, for example, as shown in FIG. 9. In FIG. 9, the temperature sensor 51p for the LCD 51, the temperature sensor 52p for the power source 52, the temperature sensor 53p for the substrate 53, and the temperature sensor 54p for the inverter 54 are shown; however, the temperature sensor needs to be provided in at least one constituent device.

As shown in FIG. 5, the temperature status of the LCD 51 of the display device 11 is collectively displayed on the status display panel 19 as the driving status of the display device 11 based on the monitoring information of the temperature of the respective constituent devices, and such a display mode is used such that when the driving status of the display device 11 is normal, corresponding one of the status display unit 50 is turned off, when the driving status of the display device 11 is abnormal, corresponding one of the status display unit 50 is illuminated (alarm display), and when the driving status of the display device 11 is in a predetermined warning condition, corresponding one of the status display unit 50 blinks (alarm display).

Figure 10:
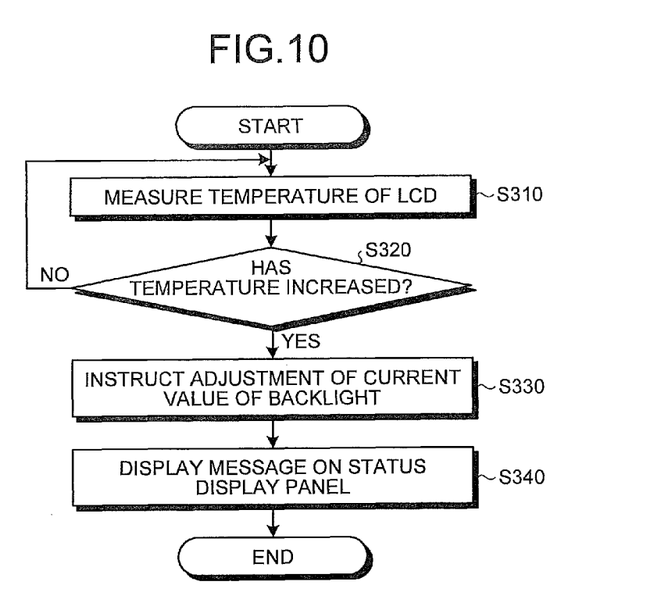
FIG. 10 is a flowchart for explaining an operation of the in-train display-device management system according to the second embodiment of the present invention.

An operation of the in-train display-device management system according to the second embodiment is explained next with reference to FIG. 10, for a case that the temperature information at the time of displaying an image on the liquid crystal display (LCD) 51 is used as the monitoring information, as an example. FIG. 10 is a flowchart for explaining the operation of the in-train display-device management system.

First, the temperature sensor 51p for the LCD 51 in the respective monitoring units 10s measures the temperature of the liquid crystal display (LCD) 51 at the time of displaying an image on the respective display devices 11 periodically with a predetermined interval so as to generate temperature information as the monitoring information (Step S310).

Next, the analyzer 41 acquires and analyzes the monitoring information of all of the display devices 11 so as to generate analysis information of the driving status of all of the display devices 11. That is, the analyzer 41 acquires temperature information of all of the display devices 11 as the monitoring information. The analyzer 41 then determines whether the temperature of the liquid crystal display (LCD) 51 of the display device 11 has increased to a level higher than the predetermined value for maintaining the image display quality based on the acquired temperature information, and generates a determination result thereof as the analysis information (Step S320).

When analysis information indicating that the temperature of the liquid crystal display (LCD) 51 of the display device 11 has not increased to the level higher than the predetermined value for maintaining the image display quality (normal temperature information) is generated (NO at Step S320), the analyzer 41 transmits the analysis information (normal temperature information) to the temperature sensor 51p in the monitoring unit 10s. The temperature sensor 51p continues measurement of temperature of the liquid crystal display (LCD) 51 based on the analysis information (normal temperature information) (Step S310). The analyzer 41 also transmits the analysis information (normal temperature information) to the display controller 42. The display controller 42 causes a message indicating that the temperature of the display device 11 (the liquid crystal display (LCD) 51) is normal to be displayed on the status display panel 19 based on the analysis information (normal temperature information).

On the other hand, when analysis information indicating that the temperature of the liquid crystal display (LCD) 51 of the display device 11 has increased to a level higher than the predetermined value for maintaining the image display quality (temperature increase information) (YES at Step S320), the analyzer 41 transmits the analysis information (temperature increase information) to the display device 11 as current-value adjustment-instruction information of the backlight so as to instruct the display device 11 to adjust a current value of the backlight of the liquid crystal display (LCD) 51 (Step S330). The display device 11 adjusts the current value of the backlight of the liquid crystal display (LCD) 51 based on the analysis information (temperature increase information).

Further, the analyzer 41 generates analysis information indicating that the temperature is abnormal (abnormal temperature information) as the analysis information and transmits the analysis information to the display controller 42. The display controller 42 causes a message indicating that the temperature of the display device 11 is abnormal to be displayed on the status display panel 19 based on the analysis information (abnormal temperature information) (alarm display) (Step S340).

According to the above processes, the in-train display-device management system according to the second embodiment can display the driving status (the temperature status of the liquid crystal display (LCD) 51) of all of the display devices 11 arranged in the first to third cars T1 to T3 on the status display panel 19 and collectively manage the driving status. In this state, if the temperature sensor is provided in a constituent device other than the liquid crystal display (LCD) 51 (for example, the inverter 54) in the display device 11 and the temperature acquired by the temperature sensor is used as the monitoring information, abnormality of the display device 11 is recognized in detail and in advance, which leads to an improvement of services for the passengers.

In the above descriptions, a case that the in-train display-device management device 10a is incorporated in the leading vehicle has been explained; however, in the present invention, the in-train display-device management device 10a does not need to be incorporated in the leading vehicle. For example, the in-train display-device management device 10a can be incorporated in a conductor seat in the last vehicle. The in-train display-device management device 10a may not be a device that manages only the display devices in the vehicle, and can be incorporated in a monitoring device (a train information device) that monitors respective devices in the train.

Figure 11:
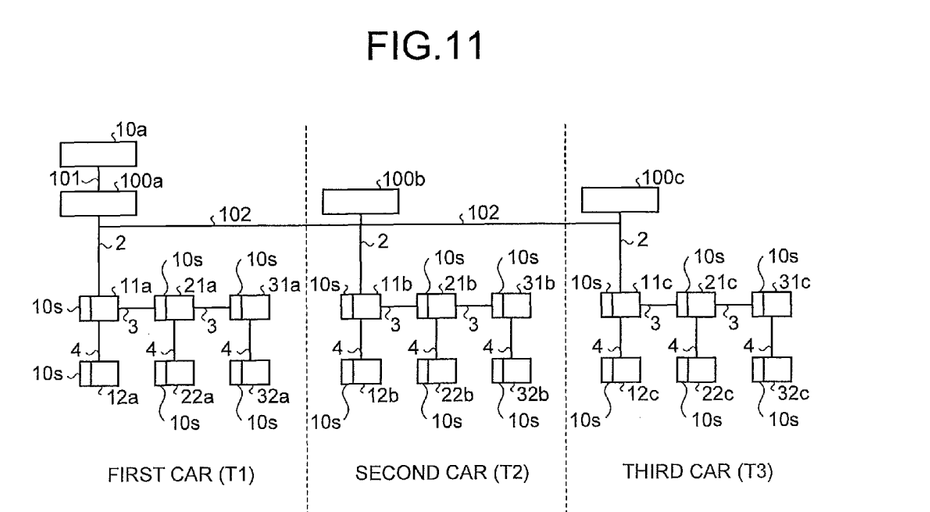
FIG. 11 is an explanatory diagram of another configuration of the in-train display-device management system according to the first and second embodiments of the present invention.

A configuration in which the in-train display-device management device 10a includes the analyzer 41, the display controller 42, the storage unit 18, and the status display panel 19 has been explained above. However, the present invention is not limited to the configuration. For example, as shown in FIG. 11, an analyzer 100a for the first car T1, an analyzer 100b for the second car T2, and an analyzer 100c for the third car T3 are arranged respectively in each vehicle as the function of the analyzer 41.

In this case, the in-train display-device management device 10a and the analyzer 100a are connected by a transmission path 101, and the analyzers 100a, 100b, and 100c are connected respectively via a transmission path 102. Both the digital transmission path and the analog transmission path can be used as the transmission paths 101 and 102.

As described above, according to the in-train display-device management system of the second embodiment, because the status of a plurality of display devices arranged in vehicles of a train are collectively displayed on one screen, the status of the display devices can be easily and collectively ascertained and managed, and therefore maintenance of the display devices arranged in the vehicle can be easily managed.

Because status management of a plurality of display devices can be easily and collectively ascertained and managed even during train operations, maintenance can be prepared during an operation of a train, and when there is a display device that requires maintenance, the maintenance thereof can be promptly started after completion of the operation of the train.

INDUSTRIAL APPLICABILITY

As described above, the in-train display-device management system according to the present invention is useful for status management and maintenance management of display devices when a plurality of display devices are arranged in vehicles of a train.

The invention claimed is:

1. An in-train display-device management system incorporated in a train constituted by a plurality of vehicles and connected to a plurality of display devices arranged in each vehicle of the train by a transmission path, the in-train display-device management system comprising:

a monitoring unit that detects a driving status of the display devices to generate monitoring information;

an analyzer that generates, as analysis information of the driving status of the display devices, as a result of determination whether the display devices maintain image display quality based on the monitoring information of the display devices;

a storage unit that stores the monitoring information and the analysis information;

a status display panel that collectively displays the driving status of the display devices per vehicle unit based on the analysis information; and a display controller that controls display on the status display panel, and displays a predetermined alarm indicating that an end of operating life is approaching on the status display panel, as the driving status of the display devices, based on the analysis information of the display devices before the end of operating life, wherein the monitoring information is luminance information at a time of displaying an image on the display devices, and the analyzer analyzes the driving status of the display devices based on the luminance information, and when luminance at a time of displaying an image on the display devices is in a range between a mean value of luminance of entirety of the display devices collectively managed and a half-value of standard luminance set in advance at a time of displaying an image, the display controller causes the predetermined alarm to be displayed on the status display panel.

2. The in-train display-device management system according to claim 1, wherein when luminance decrease information indicating that luminance of the display devices has decreased to a level lower than a predetermined value for maintaining image display quality is generated as the analysis information, the analyzer transmits current-value adjustment-instruction information for instructing adjustment of a driving current of the display devices to the display devices, and the display devices adjust a driving current based on the current-value adjustment-instruction information, upon reception of the current-value adjustment-instruction information.

3. The in-train display-device management system according to claim 1, wherein an elapsed display time information of image display on the display devices is further used as the monitoring information, and the analyzer analyzes the driving status of the display devices based on the luminance information and the elapsed display time information.

4. The in-train display-device management system according to claim 1, wherein when the elapsed time exceeds a predetermined number of hours set in advance, the display controller causes the predetermined alarm to be displayed on the status display panel.

5. The in-train display-device management system according to claim 1, wherein temperature information in a casing in the display devices is further used as the monitoring information, and the analyzer analyzes the driving status of the display devices based on the luminance information and the temperature information.

6. The in-train display-device management system according to claim 1, wherein the analyzer analyzes the driving status of the display devices and sets respective replacement times of the display devices.

7. The in-train display-device management system according to claim 1, wherein the status display panel collectively displays the driving status of the display devices in a vehicle unit and a formation unit.

8. The in-train display-device management system according to claim 1, further comprising a management center that can receive the analysis information transmitted from the analyzer and collectively manages the analysis information of all of the display devices arranged in a plurality of trains, which are targets of management, wherein the management center includes:

a management-status display panel that collectively displays the driving status of all of the display devices arranged in the trains, which are targets of management, per vehicle unit based on analysis information transmitted from the analyzer in the trains; and a display controller that controls display on the management-status display panel, and displays a predetermined alarm indicating that an end of operating life is approaching on the management-status display panel, as the driving status of the display devices, based on the analysis information of all of the display devices.

9. An in-train display-device management method, which is a management method of a plurality of display devices arranged in vehicles of a train, the method comprising:

a monitoring step of detecting a driving status of the display devices and generating monitoring information;

an analyzing step of generating, as analysis information of the driving status, as a result of determination whether the display devices maintain image display quality based on the monitoring information of the display devices; and a driving-status display step of collectively displaying per vehicle unit a predetermined alarm indicating that an end of operating life is approaching on a status display panel as the driving status of the display devices based on the analysis information of the display devices before the end of operating life, wherein the monitoring information is luminance information at a time of displaying an image on the display devices, and the analyzing step includes analyzing the driving status of the display devices based on the luminance information, and when luminance at a time of displaying an image on the display devices is in a range between a mean value of luminance of entirety of the display devices collectively managed and a half-value of standard luminance set in advance at a time of displaying an image, the driving-status display step includes causing the predetermined alarm to be displayed on the status display panel.

10. The in-train display-device management method according to claim 9, wherein when luminance decrease information indicating that luminance of the display devices has decreased to a level lower than a predetermined value for maintaining image display quality is generated, as a result of analysis at the analyzing step, adjustment of a driving current of the display devices in which the luminance has decreased to a level lower than a predetermined value for maintaining the image display quality is performed based on the luminance decrease information.

11. The in-train display-device management method according to claim 9, wherein an elapsed display time information of image display on the display devices is further used as the monitoring information, and the analyzing step includes analyzing the driving status of the display devices based on the luminance information and the elapsed display time information.

12. The in-train display-device management method according to claim 9, wherein temperature information in a casing in the display devices is further used as the monitoring information, and the analyzing step includes analyzing the driving status of the display devices based on the luminance information and the temperature information.

13. The in-train display-device management method according to claim 9, wherein the analyzing step includes analyzing the driving status of the display devices and setting respective replacement times of the display devices.

14. The in-train display-device management method according to claim 9, wherein the driving-status display step includes collectively displaying the driving status of the display devices in a vehicle unit and a formation unit.

15. The in-train display-device management method according to claim 9, wherein the analyzing step in the trains includes transmitting the analysis information of all of the display devices arranged in a plurality of trains, which are targets of management, to a management center that collectively manages the analysis information, and the management center displays a predetermined alarm indicating that an end of operating life is approaching on a status display panel, as the driving status of the display devices, based on the analysis information of all of the display devices arranged in the trains, which is transmitted from the analyzing step in the trains.

* * * * *